March 22, 1949.    L. C. PACKER    2,465,262
MOTOR GENERATOR
Filed Nov. 16, 1944
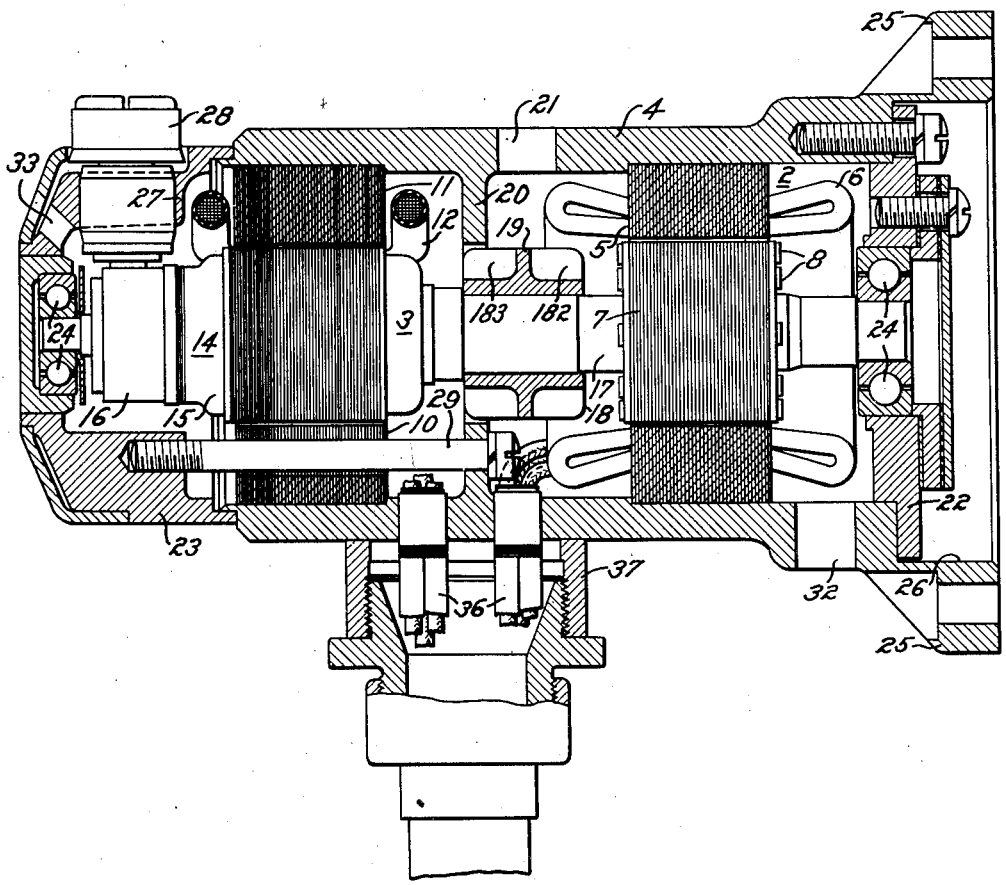
WITNESSES:
Wm. B. Sellers
INVENTOR
Lewis C. Packer
BY O. B. Buchanan
ATTORNEY Patented Mar. 22, 1949

2,465,262

UNITED STATES PATENT OFFICE 2,465,262

MOTOR GENERATOR

Lewis C. Packer, Longmeadow, Mass., assignor to Westinghouse Electric Corporation, East Pittsburgh, Pa., a corporation of Pennsylvania Application November 16, 1944, Serial No. 563,657

6 Claims. (Cl. 171—123)

My invention relates to a small, rigid motor-generator set, that can be supported in a horizontal position from one end (or from any other point along its length), preferably with special ventilating-means and special end-bracket securing-means, and with sufficient strength and rigidity to withstand severe shocks.

The objects of the invention are to provide novel means and structure whereby a set of the type just stated may be produced.

A preferred form of embodiment of the invention is shown in the accompanying drawing, the single figure of which is a longitudinal sectional view of a motor-generator set, with slightly different section-planes for the top and bottom halves of the figure.

In the drawing, I have shown an electric-machine-set, in the form of a motor-generator set, comprising two dynamo-electric machines, in the form of an alternating-current motor 2, and a direct-current generator 3. The particular motor 2, which is shown, is a small three-phase, two-pole, 240-cycle motor, operating at a speed of approximately 13,000 R. P. M., although I am not limited, of course, to any particular size or rating. The direct-current generator 3, which is shown, is a control-purpose generator, adapted to deliver a variable voltage under variable-excitation, although, here again, I am not limited to any particular type of machine.

According to my invention, the motor 2 and the generator 3 are mounted within a rigid tubular steel frame 4, the motor being at the right-hand end, and the generator at the left-hand end, as shown. The motor 2 has a stator-member 5, having a primary winding 6, and a rotor-member 7, having a squirrel-cage or other secondary winding 8. The generator 3 has a stator-member 10, having a field-magnet assembly 11, carrying the field-windings 12. The field-magnet assembly 11 is made of punchings or laminations, as shown, instead of the usual solid construction, giving the generator a low time-constant, in the neighborhood of .002 second. The field-magnet laminations are made of steel, which has a higher magnetic permeability than iron, thus contributing to a reduction in the overall size of the generator. The generator 3 also has a rotor-member 14, comprising an armature 15 and a commutator 16.

The rotor-members 7 and 14 of the two machines 2 and 3 are disposed within their respective stator-members 5 and 10, and they are mounted on a common shaft 17. The part of the shaft between the two rotors carries a fan-member 18, shown as a double centrifugal blower-fan, having two sets of blades 182 and 183, separated by a central baffle or partition 19.

The tubular frame 4 of the motor-generator set is provided with an intermediately disposed ring 20, which is integral with the frame or otherwise rigidly disposed inside of the frame, in the portion of the frame between the two stator-members 5 and 10. The inner periphery of the ring 20 extends into close proximity to the outer periphery of the fan-member 18, so that the ring serves as a baffle for controlling or directing the flow of air, or other ventilating-medium, drawn by the fan-member 18. Preferably, the ring is at the left-hand end, or generator-end, of the fan-member 18, and a plurality of outlet ventilating-ducts or openings 21 are provided in the portion of the frame 4 immediately to the right of the ring 20, or radially opposite to the fan-member 18, for discharging the ventilating-medium discharged by said fan-member.

According to my invention, I utilize a two-bearing motor-generator set. The tubular frame 4 has two end-members 22 and 23, one for each end. Each of the end-members 22 and 23 carries a bearing 24, for rotatably supporting its end of the shaft 17.

According to one feature of my invention, the motor-generator set is end-mounted, or supported from only one end, and in spite of its great length, as compared to its diameter, it remains rigid, and shock-resistant, even though it is supported, in a horizontal position, from only one point along its length. As shown, the set is supported from its motor-end, or right-hand end, by having a plurality of supporting-feet 25, which are carried by the frame 4 at said end, so as to be adapted to be secured to a vertical supporting-surface (not shown).

According to another feature of my invention, the right-hand end-member 22, or the one at the supported end of the set, is special, being in the form of a flat or disk-like bearing-cap which is disposed inside of the frame 4. The frame is provided, at this end, with a groove 26, in which the end-member 22 is supported, and detachably held in place, in a position spaced from the plane of the supporting-feet 25.

According to still another feature of my invention, the left-hand end-member 23 is also specially supported. This end-member 23 is at the direct-current end of the set, and it is preferably of a familiar cup-shaped end-bracket construction, having a cylindrical (or other) wall-portion 27, which carries the brushholders 28 which cooperate with the commutator 16. This end-bracket 23 is held in place against the left-hand end of the tubular frame 4, by means of a plurality of bolts 29 (or other tension-members) which extend in an axial direction between said end-bracket and the ring 20, so that the ring thus serves the additional function of an abutment-means for the through-bolts 29, in addition to its function as a baffle. This through-bolt securing-means for the left-hand end-member 23 avoids the necessity for a flanged connection at the joint between the end-bracket 23 and the tubular frame 4, and it also avoids extending the through-bolts 29 all the way through the motor-generator set, (including the motor-stator member 5), which would not only entail extremely long bolts, but the bolt-holes would take up valuable space and would critically reduce the available cross-section of magnetic material in the hard-worked laminated steel of the motor-stator member 5.

In order to complete the ventilating-circuits, my motor-generator set is provided with one or more intake ventilating-ducts or openings 32 and 33 in each end, so that the fan 18 will draw air in, from each end of the set, the streams of air ventilating the motor 2 and the generator 3, respectively, and then uniting at the fan, and being expelled through the outlet ventilating-ducts or openings 21.

The terminal conductors 36 of the motor-generator set extend out through a conduit-connection 37 which is a part of the frame 4, being preferably brazed to the frame.

In by present construction, as shown, the frame 4, including the supporting-feet 25 and the inner ring 20, is machined out of a single solid piece of steel. It is possible, however, to utilize other materials, commensurate with the requirements as to the necessary strength and rigidity, and it is possible, also to utilize a fabricated construction, in parts or sections which are brazed together, or otherwise suitably joined into a substantially one-piece construction.

With these thoughts in mind, I desire that the appended claims shall be accorded the broadest construction consistent with their language.

I claim as my invention:

1. An end-mounted dynamo-electric machine, comprising a rigid tubular frame, supporting-foot-means carried by said frame at one end, adapted to support said machine from a supporting-member in a plane at right angles to the axis of said tubular frame, a stator-member separably and rigidly mounted within said frame, a rotor-member disposed within said stator-member, a shaft for the rotor-member, and an end-member disposed at each end of said frame and separably secured against said frame, each end-member carrying a bearing for rotatably supporting said shaft, the end-member at the supported end of the frame being disposed inside of the frame, the frame having a groove therein wherein said end-member is supported in a position spaced from the plane of the supporting-foot-means.

2. And end-mounted electric-machine-set, comprising a rigid tubular frame, supporting-foot-means carried by said frame at one end, adapted to support said set from a supporting-member in a plane at right angles to the axis of said tubular frame, two dynamo-electric machines mounted within said frame, one at each end, each machine comprising a stator-member separable from said frame, and a rotor-member, a common shaft for the two rotor-members, a fan-member carried by the part of the shaft between the two rotor-members, a ring rigidly disposed inside of said frame in proximity to the outer periphery of said fan-member whereby said ring serves as a baffle for controlling the flow of ventilating-medium produced by said fan-member, and an end-member disposed at each end of said frame and separably secured against said frame, each end-member carrying a bearing for rotatably supporting said shaft, said set having one or more intake ventilating ducts at each end, and having one or more outlet ventilating ducts in an intermediate position in said frame for discharging the ventilating-medium discharged by said fan-means, the end-member at the supported end of the frame being disposed inside of the frame, the frame having a groove therein wherein said end-member is supported in a position spaced from the plane of the supporting-foot-means.

3. A motor-generator set, comprising a rigid tubular frame, an alternating-current dynamo-electric machine and a direct-current dynamo-electric machine mounted within said frame, one at each end, with the commutator-end of the direct-current machine disposed at the end of the frame, each machine comprising a stator-member and a rotor-member, a common shaft for the two rotor-members, abutment-means disposed inside of said frame in the space between the two machines, an end-member disposed at each end of said frame, each end-member carrying a bearing for rotatably supporting said shaft, and securing-means for securing the end-member at the direct-current end of the set, said securing-means comprising a plurality of tension-members extending in an axial direction between said end-member and said abutment-means.

4. A motor-generator set, comprising a rigid tubular frame, an alternating-current dynamo-electric machine and a direct-current dynamo-electric machine mounted within said frame, one at each end, with the commutator-end of the direct-current machine disposed at the end of the frame, each machine comprising a stator-member separable from said frame, and a rotor-member, a common shaft for the two rotor-members, a fan-member carried by the part of the shaft between the two rotor-members, a ring disposed inside of said frame in proximity to the outer periphery of said fan-member whereby said ring serves as a baffle for controlling the flow of ventilating-medium produced by said fan-member, an end-member disposed at each end of said frame and separably secured against said frame, each end-member carrying a bearing for rotatably supporting said shaft, said set having one or more intake ventilating ducts at each end, and having one or more outlet ventilating ducts in an intermediate position in said frame for discharging the ventilating-medium discharged by said fan-means, and securing-means for securing the end-member at the direct-current end of the set, said securing-means comprising a plurality of tension-members extending in an axial direction between said end-member and said ring.

5. An end-mounted motor-generator set, comprising a rigid tubular frame, supporting-foot-means carried by said frame at one end, adapted to support said set from a supporting-member in a plane at right-angles to the axis of said tubular frame, an alternating-current dynamo-electric machine mounted within the frame at the supported end of the set, a direct-current dynamo-electric machine mounted within the frame at the other end, with the commutator-end of the direct-current machine disposed at the end of the frame, each machine comprising a stator-member separable from said frame, and a rotor-member, a common shaft for the two rotor-members, abutment-means disposed inside of said frame in the space between the two machines, an end-member disposed at each end of said frame and separably secured against said frame, each end-member carrying a bearing for rotatably supporting said shaft, the end-member at the supported end of the frame being disposed inside of the frame, the frame having a groove therein wherein said end-member is supported in a position spaced from the plane of the supporting-foot-means, and securing-means for securing the end-member at the direct-current end of the set, said securing-means comprising a plurality of tension-members extending in an axial direction between said end-member and said abutment-means.

6. A dynamo-electric machine comprising a stator-member and a rotor-member, a shaft for said rotor-member, a bearing for each end of the shaft, said stator-member comprising a frame, supporting-foot-means carried by said frame at one end, adapted to support said machine from a supporting-member in a plane at right angles to the axis of the machine, and an end-member disposed inside of the frame and secured thereto at the supported end of the frame, the frame having a groove therein wherein said end-member is supported in a position spaced from the plane of the supporting-foot-means.

LEWIS C. PACKER.

REFERENCES CITED

The following references are of record in the file of this patent:

UNITED STATES PATENTS

| Number | Name | Date |
|---|---|---|
| 1,405,965 | Bunch | Feb. 7, 1922 |
| 1,654,305 | Nottage | Dec. 27, 1927 |
| 1,664,540 | Chryst | Apr. 3, 1928 |
| 2,006,172 | Klappauf | June 25, 1935 |
| 2,084,341 | Hornaday | June 22, 1937 |
| 2,085,275 | Schmidt | June 29, 1937 |

FOREIGN PATENTS

| Number | Country | Date |
|---|---|---|
| 203,885 | Germany | Oct. 31, 1908 |